United States Patent
Broughton

(10) Patent No.: US 7,720,703 B1
(45) Date of Patent: *May 18, 2010

(54) SYSTEM AND METHOD FOR TRACKING AND MANAGING CONSTRUCTION PROJECTS

(75) Inventor: W. Curtis Broughton, Littleton, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 2554 days.

This patent is subject to a terminal disclaimer.

(21) Appl. No.: 09/777,042

(22) Filed: Feb. 5, 2001

(51) Int. Cl.
*G06F 17/00* (2006.01)

(52) U.S. Cl. .................... 705/8; 705/7; 705/9

(58) Field of Classification Search ............... None
See application file for complete search history.

(56) References Cited

U.S. PATENT DOCUMENTS

| | | | |
|---|---|---|---|
| 4,181,954 A | | 1/1980 | Rosenthal et al. |
| 4,700,318 A | * | 10/1987 | Ockman .................... 345/595 |
| 4,782,448 A | | 11/1988 | Milstein |
| 5,189,606 A | | 2/1993 | Burns et al. |
| 5,689,705 A | * | 11/1997 | Fino et al. .................. 707/201 |
| 5,918,219 A | | 6/1999 | Isherwood |
| 5,920,849 A | | 7/1999 | Broughton et al. |
| 5,950,206 A | | 9/1999 | Krause |
| 6,014,503 A | * | 1/2000 | Nagata et al. ................. 703/1 |
| 6,038,547 A | * | 3/2000 | Casto ........................ 705/30 |
| 6,421,586 B1 | | 7/2002 | Nicotera |
| 6,604,124 B1 | * | 8/2003 | Archbold .................... 718/103 |
| 6,842,760 B1 | * | 1/2005 | Dorgan et al. ............ 707/104.1 |

(Continued)

FOREIGN PATENT DOCUMENTS

JP 7113324 5/1995

(Continued)

OTHER PUBLICATIONS

Meridian Project Systems, Inc., www.mps.com, Prolog Construction Management Software Suite, Dec. 1999-Jan. 2000 [retrieved Sep. 29, 2003], 35 pages, downloaded from <url: http//web.archive.org/... www.mps.com.*

(Continued)

*Primary Examiner*—Ramesh B Patel
*Assistant Examiner*—Dave Robertson
(74) *Attorney, Agent, or Firm*—Townsend and Townsend and Crew, LLP

(57) ABSTRACT

System and methods are described for assisting a contractor in managing information associated with a construction project. The amount of information relating to labor, materials, scheduling and billing and the number of individuals accessing the information can be overwhelmingly large for even a simple construction project. As such, the system and methods described are particularly useful for gathering, maintaining and disseminating the voluminous amount of information associated with a construction project. In one method, a drawing from a construction project is provided that has one or more intelligent objects. Information is then gathered relating to labor, materials and schedules for the project. The information is associated with the respective intelligent object and visually represented on the drawing. The drawing is displayed and certain aspects associated with the intelligent objects can be quickly identified. In addition, reports may be generated that quickly and efficiently organize information according to any number of user selected criteria.

8 Claims, 14 Drawing Sheets

U.S. PATENT DOCUMENTS

| | | | |
|---|---|---|---|
| 7,031,930 B2 * | 4/2006 | Freeman et al. | 705/9 |
| 7,089,203 B1 * | 8/2006 | Crookshanks | 705/37 |
| 7,349,863 B1 * | 3/2008 | Pena-Mora et al. | 705/8 |
| 7,529,650 B2 * | 5/2009 | Wakelam et al. | 703/1 |
| 2002/0026343 A1 * | 2/2002 | Duenke | 705/8 |
| 2004/0059539 A1 * | 3/2004 | Otsuki et al. | 702/150 |
| 2006/0015475 A1 * | 1/2006 | Birkner et al. | 707/1 |
| 2009/0070182 A1 * | 3/2009 | Eder | 705/8 |

FOREIGN PATENT DOCUMENTS

| | | |
|---|---|---|
| JP | 9279843 | 10/1997 |
| JP | 2001350807 | 12/2001 |
| WO | WO 98/34178 | 8/1998 |
| WO | WO 0077684 A1 * | 12/2000 |

OTHER PUBLICATIONS

Kajewski, Stephen L. et al (2001) Handheld technology review. Technical Report 2001-008-C-06, CRC-CI, Queensland University of Technology, [retrieved Jan. 28, 2008 from <url: http://eprints.qutedu.au/archive/00007994>], 97 pages.*

Koo, Bonsang and Fischer, Martin. Feasibility Study of 4D CAD in Commercial Construction. Stanford University Center for Integrated Facility Engineering (CIFE) Technical Report #118, Aug. 1998, Cover-to-Page 104 and Bibliography. Retrieved from http://www-leland.stanford.edu/group/CIFE/online.publications/TR118.pdf [downloaded Nov. 10, 2009].*

John A. Wolff, IBM Global Services, "RFID tags—an intelligent bar code replacement."

"Mechanical Estimating User Manual," QuickPen International, 1987.

George M. Lewellyn, "CAD and the HVAC contractor," Air Conditioning, Heating & Refrigeration News, v. 185, 4 pages.

* cited by examiner

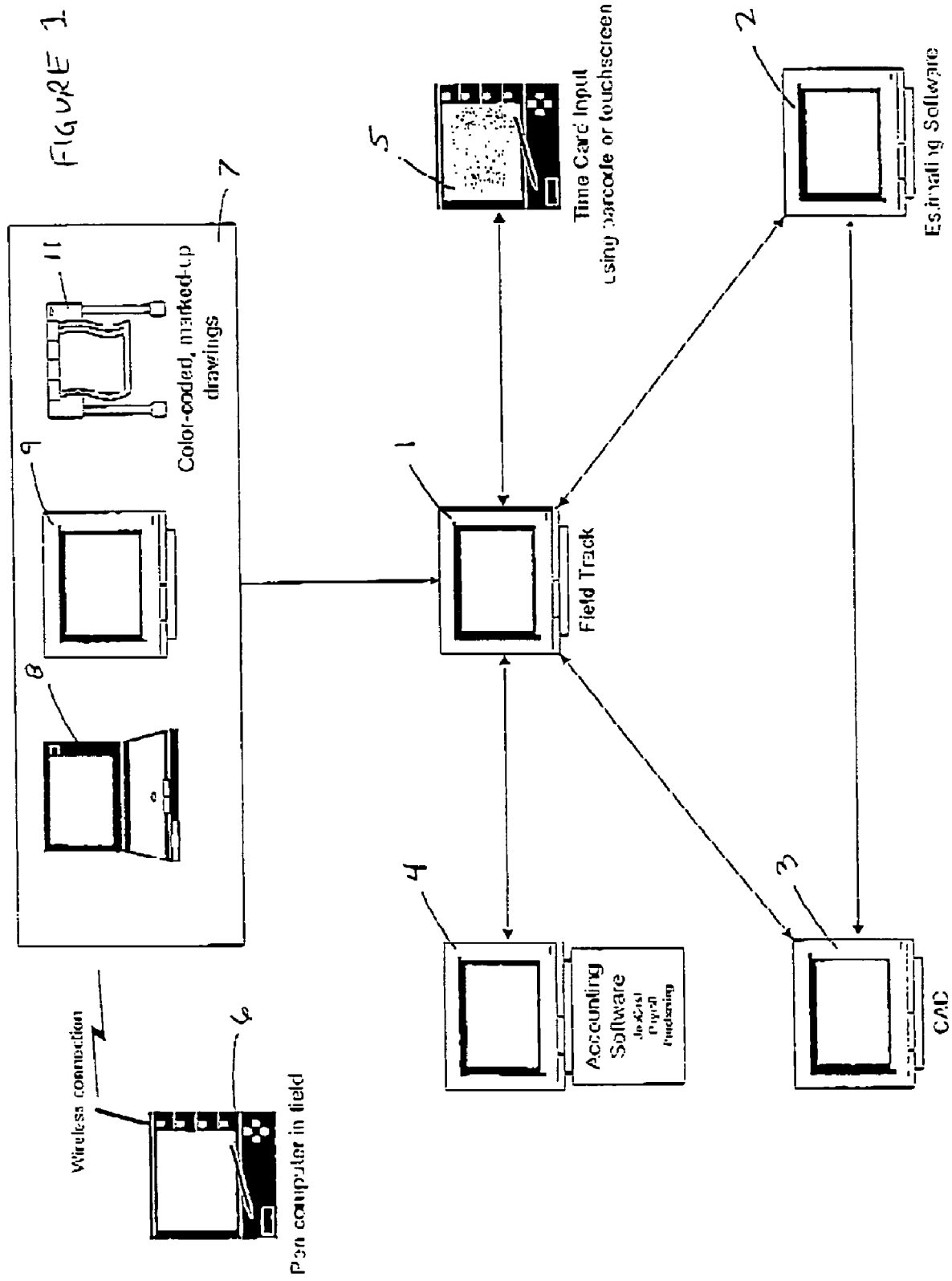

From Fig. 2

| Material Control | 34 |
|---|---|
| ( User Defined ) | |
| Cost Code | 1000 |
| P.O. Number | 17954A |
| Cost | $ 568.00 |
| On Hold | |
| Released for delivery | |
| Shipped | |
| Received | |
| Back ordered | Yes |

From Fig. 2

| Labor Control | 36 | Work In |
|---|---|---|
| ( User Defined ) | Task Code | Place |
| Cost Code | 1000-1 | |
| Labor Unit | 4.34 | |
| Material Distribution | 10 | 0.65 |
| Hangers | 20 | 0 |
| Layout / Inserts | 21 | 0 |
| Item in Place | 30 | 2.61 |
| Joint Make Up | 40 | 0.7 |
| Test | 50 | |
| Punch & I.D. | 60 | |
| Todate - Hours | | 3.96 |

*From Fig. 2*  
38

*Fig. 2(c)*

| Schedule | | Start | Scheduled Completion | Complete |
|---|---|---|---|---|
| (User Defined) | | Date | Date | Date |
| Material Distribution | 0.65 | 6/12/00 | 6/14/00 | |
| Hangers | 0 | | | |
| Layout / Inserts | 0 | | | |
| Item In Place | 2.61 | 7/18/00 | 7/28/00 | 7/26/00 |
| Joint Make Up | 0.7 | 7/19/00 | 7/29/00 | 8/3/00 |
| Test | | 11/26/00 | 12/14/00 | |
| Punch & I.D. | | 5/11/01 | 6/1/01 | |

*From Fig 2*  
40

| Billing | | Completion | Billed |
|---|---|---|---|
| (User Defined) | | Date | |
| Material Delivered | | 5/24/00 | Jun-00 |
| Installed (Complete) | | 8/3/00 | Aug-00 |
| Complete | | | |

*Fig. 2(d)*

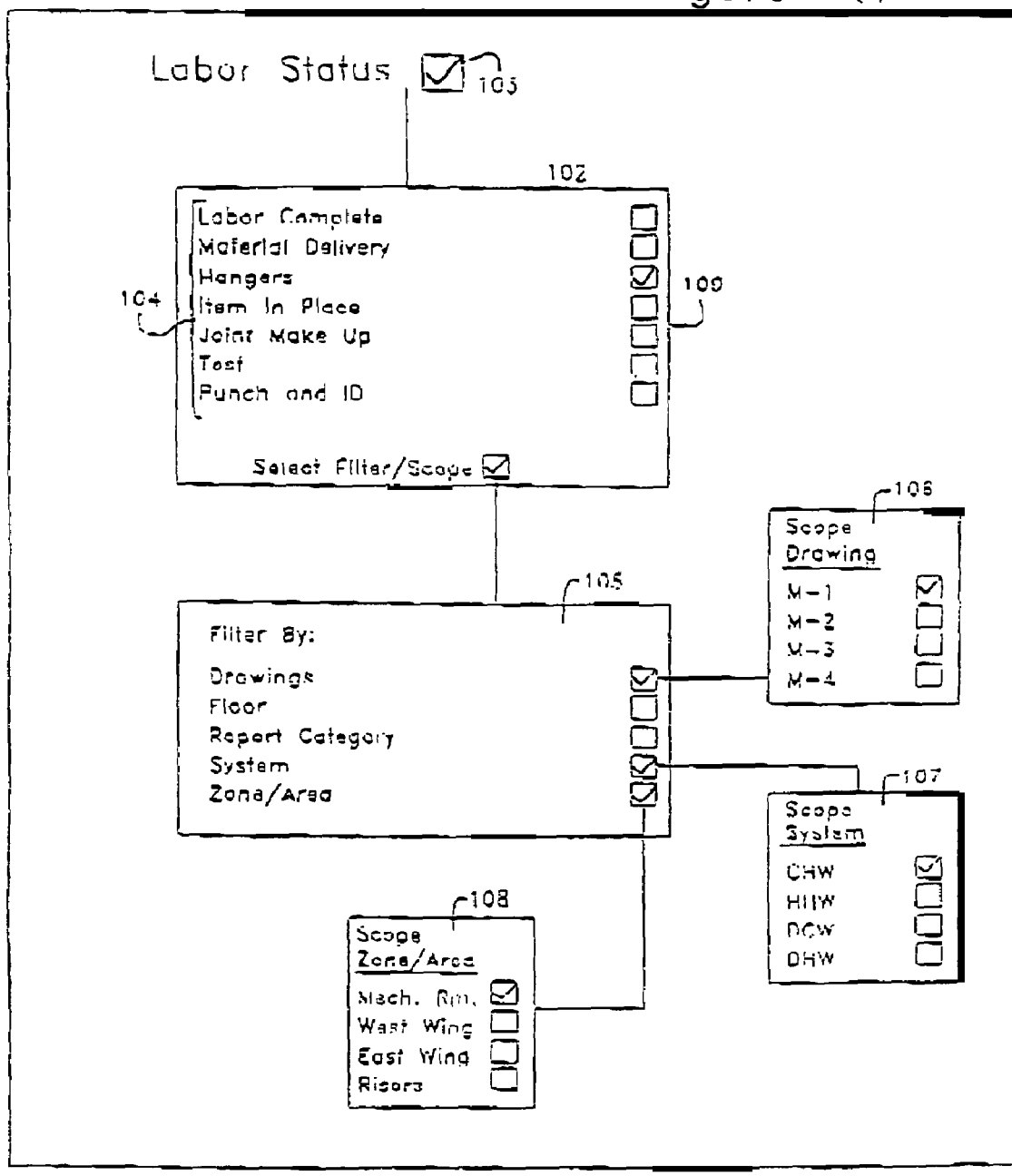

Fig. 5

| Task | Estimated Hours | Credited Hours | Actual Hours |
|---|---|---|---|
| Material Distribution | 97 | 97 | 86 |
| Item In Place | 302 | 218 | 256 |
| Joint Make Up | 195 | 167 | 173 |
| Test | 19 | 0 | 0 |
| Punch and ID | 32 | 0 | 0 |
| Total | 645 | 482 | 520 |

Reporting Date: 6/24/2000

Scope: Drawing M-2: CHW: Me

Item Filter: All

Report filter: Estimate to Actual

Tabs: Labor | Schedule | Material | Billing

Buttons: Delete, New, OK, Cancel, Details

Fig. 7

| Item | Line # | Not Ordered | Ordered |
|---|---|---|---|
| 6" Nibco Valve | 248 | | 17954A |
| 4" Nibco Valve | 311 | Yes | 17954A |
| 6x6x4 Tee | 346 | Yes | |
| 6x6x3 Tee | 385 | | |
| Punch and ID | 429 | | 1854A |
| CH-1 Trane Chiller | 1238 | | 2147A |

Labor | Schedule | Material | Billing

Reporting Date: 5/24/2003
Scope: Drawing M-2
Item Filter: All
Status Filter: Not Received Delete   New OK   Cancel   Details

Fig. 9

| Labor | Schedule | Material | Billing |

Reporting Date: 6/24/2000

Scope: Drawing M-2: CHW: Me ▼

Item Filter: All Tasks ▼

Report Filter: Schedule Dates ▼

| Schedule | Start Date | Scheduled Completion | Completion Date |
|---|---|---|---|
| Material Distribution | 06/12/2000 | 05/14/2000 | 06/15/2000 |
| Hangers | 06/29/2000 | 07/02/2000 | 07/05/2000 |
| Layout / Inserts | | Yes | |
| Item In Place | 07/16/2000 | 07/23/2000 | 07/26/2000 |
| Joint Make Up | 07/19/2000 | 07/29/2000 | 08/03/2000 |
| Test | 11/26/2000 | 12/14/2000 | |
| Punch & I.D. | 05/11/2001 | 06/01/2001 | |

Delete    New

OK    Cancel    Details

SYSTEM AND METHOD FOR TRACKING AND MANAGING CONSTRUCTION PROJECTS

BACKGROUND OF THE INVENTION

This invention relates generally to the field of contracting, construction and project management, and in particular to the management of materials, labor, scheduling and billing for a construction project. More specifically, the invention provides both systems and methods for assisting a contractor, supplier and/or project manager in efficiently managing and disseminating the information for a construction project.

One important aspect of a contractor's job is the effective management of an ongoing construction project, which includes the tight control of the associated costs. Since a contractor desires to present a competitive bid while still being able to produce a profit, estimates of the costs involved in completing the project need to be closely estimated. As a result, there is usually little room to deviate from the estimated costs when the work is actually performed.

Another important aspect of a contractor's job is the monitoring of the project until completion so that adjustments can be quickly made and there are no surprises at the end of the project. For example, if labor went unmonitored, the end of the project may bring with it the shocking conclusion that labor far exceeded the budgeted amount. The overrun on labor would thus affect the bottom line profitability for the project. Similar scenarios could be described for the on-time delivery of materials used in a project. An early warning on material and labor issues can greatly help prevent such surprises that affect profitability.

Such a task can be challenging because construction management involves the gathering and managing of large amounts of information from multiple sources concerning the material delivery, labor costs, scheduling of events and billing for an ongoing project. For large projects, the amount of information to capture, track and manage can be overwhelming.

A particularly time consuming aspect of a contractor's job is the gathering of data for a construction project. In a perfect world, data is captured or generated from a single source at a single location. However, a construction project is far from a perfect world. In most cases, information is captured by various unrelated data capture programs or generated from a multitude of dissimilar sources. A large number of hours can be spent and wasted gathering and organizing the information. Since data capture can be such a time consuming endeavor, it expends valuable time that a contractor could spend on other, more profitable tasks.

Hence, it would be desirable to provide systems and methods which would assist the contractor in gathering, managing, tracking and disseminating the voluminous amount of information necessary to control the profitability of a construction project. It would be further desirable if such systems and methods provided an early indication of areas of cost concern.

SUMMARY OF THE INVENTION

A typical construction project has several aspects that must be efficiently handled by the construction project manager to successfully oversee a project. For example, one aspect is the controlling of costs since cost overruns can significantly affect profitability. Another aspect is schedule management. To do his or her job effectively, the manager must be kept apprised of any problems that could potentially delay the project, such as labor concerns or material problems. If problems are detected early, measures may be taken to avoid unnecessary delays. Hence, one goal of construction project managers is to minimize costs in order to maximize profitability. Another goal is to complete the project in a timely manner without cost overruns and unnecessary additional incidental charges.

Another aspect of project management is billing for completed tasks. Costs for a project should be borne by the responsible party. Improper billing causes costs to be improperly allocated. If a portion of the project is complete or materials for the project have been received, this cost should be charged to the customer and not borne by the project financier.

To accomplish such tasks, a construction manager must successfully manage large amounts of information that often accompanies a construction project. To this end, the invention provides techniques to make such information readily accessible, easily portable and clearly displayable. Since the information may come from a variety of different sources and locations, the invention also provides techniques to integrate the information from multiple sources into a single location.

In one aspect, the invention provides techniques for planning, managing and evaluating large amounts of information often associated with a construction project. To accomplish such a task, the invention utilizes an electronic drawing having a number of intelligent objects. Conveniently, each construction item for the project that is shown in the electronic drawing may function as an intelligent object and have associated information. The information and association data are stored on computer readable memory for easy retrieval, such as by selecting the item with a pointing device. Color coding or other visual indicators may be used to represent the associated information, thereby allowing for a visual representation of the underlying information. In addition, a detailed description of the associated information may be obtained in user generated reports.

Information may be associated with intelligent objects in a variety of ways. One aspect of the invention provides the ability to scope information for labor completion and material delivery. For example, an update option may be provided for updating labor status. The invention provides a labor status menu in response to selecting the labor status option, which may be visually represented by an option button or the like on an electronic drawing. The labor status menu contains a selectable list of various labor tasks. Selecting one of the labor tasks returns a drop down pick list. The drop-down pick list specifies, in response to user input, the location of the completed labor for the chosen labor task. In addition, further drop-down menus may be provided in response to selecting items from the pick list. The additional drop-down menus provide for the entry of an even greater level of specificity regarding the location of the completed labor for the chosen labor task. Similar steps may be carried out for updating material delivery.

Once information is entered into the drop down pick lists and menus, the processor automatically updates the stored completion information for the selected scope. The stored information may then be used to flag the appropriate intelligent item(s) on the associated electronic drawing. In addition, for a labor status update, the processor automatically credits the estimated labor for the appropriate intelligent item(s) corresponding to a completed labor task.

There are many different types of information associated with a construction project that the invention is capable of processing. For example, such information may include labor information, material information, scheduling information, billing information, and the like. Having such information readily available from an electronic drawing allows for a quick and easy determination of the status of displayed construction items through a visual assessment. More specifically, the intelligent objects in the electronic drawing of the invention may be further broken down and analyzed according to specific information such as labor, material, scheduling and billing.

The project manager may generate a vast number of reports that illustrate the visually depicted information as shown, but provide a greater amount of detailed information in written form. Instead of providing the information in a random fashion, the invention provides numerous filters a project manager can utilize to extract and present the essential information he or she wishes to view in the reports. Such report filters include a particular drawing, floor, system, area or grouping of construction items to name a few. For example, the filters may provide a project manager with accurate and up-to-date information regarding areas that are scheduled for completion, as well as areas that have been completed.

Since the amount of information for any particular category can be quite large, the invention provides the option of breaking the invention into one or more modules for administering the various information associated with a construction project. For example, a labor module may be provided for labor information and a material module may be provided for material information. Each module is integrated with the electronic drawing, and therefore, the information associated with each intelligent object is stored and may be provided on demand.

In one aspect of the invention, labor tracking is provided for organizing the labor associated with various construction items. For example, estimated labor is received and stored by a labor module. Estimated labor may be based upon historical data, but may be manually or electronically entered based upon a bid or estimate. The term bid may be used interchangeably with the term estimate within the following the context of the following description. The labor tracking of the invention provides techniques for storing the estimated labor information and for associating the information with the various construction items.

The invention allows for a contractor to enter labor status information into a drop-down pick list or enter labor status information into a personal digital assistant (PDA) or other type of computer that contains a visual depiction of the drawing. In this way, the contractor may enter status information into a pick list or walk around the construction site and enter information into a PDA regarding installed items based upon a visual inspection. As one skilled in the art can appreciate, any method for capturing information may be used without departing from the intended scope of the invention. For example, a contractor may record an information log or check off information from a hard copy of the drawing and still achieve the same results. Periodically, actual labor is captured and entered into the labor module. The invention credits estimated labor information and associates the actual labor information with the various construction items based on the completion status of material installation. The processor stores the status information in a computer readable memory. Further, items on the drawing may be flagged, such as with a different color, based on the installation status. Once both actual labor is captured and estimated labor is credited, reports may be generated for a wide variety of comparisons.

In another aspect of the invention, material tracking is provided for monitoring the delivery of materials for the construction project. For example, material information relating to the type of item to be installed is received and stored by a module. The invention thereafter provides techniques for conveniently tracking the material from ordering through receipt and billing. The processor then updates the information, which is reflected in the electronic drawing. A quick visual inspection of the electronic drawing provides simple and up-to-date information regarding material ordering and delivery status.

In yet another aspect of the invention, schedule tracking is provided for allocating labor and materials in response to start dates and completion dates. At the beginning of a construction project, dates are tentatively set for the completion of various phases of the construction project. This information is entered into the scheduling module. These dates are highly volatile since the smallest of delays can result in significant changes in scheduled dates. For example, if materials are late to the job site for a particular area, the labor is affected for that area in addition to the labor required for installing the materials in the area. The schedule tracking of the present invention provides techniques for recognizing problems (for example, late materials shipments and labor shortages) and automatically updating any scheduling information in response to any delays.

In still another aspect of the invention, a billing module is provided for billing the completed portions of the project. Since the modules are integrated, the billing module is able to bill the customer for items such as material received, labor completed, material installed and the like. A user selects individual construction items or groups of construction items on the electronic drawing for billing. Since the cost for the items to be billed is known from the original bid or estimate, a bill is automatically generated. It is not necessary to visually inspect the construction site to determine what portion of the project is complete for purposes of billing the project. The billing module can automatically generate the bill based upon information entered into other modules. In addition, the electronic drawing can visually represent the billing status which has been billed to the project.

The data gathering, application integration and data presentation of the invention may utilize multiple computers and multiple data gathering devices operating in a networked environment, such as the Internet, to share the information and results with multiple users. The invention therefore provides the capability for several individuals to work at multiple remote sites while remaining interconnected through a network, which may make use of cellular or satellite technology. However, it may be advantageous to utilize a single computer operating at a single location. In either case, it may be possible to gather the data and display it in real time, which allows for on-the-fly changes to the project, as well as a quick review and analysis of the results.

The invention therefore provides a comprehensive software package that integrates several modules allowing for the manipulation and presentation of information gathered from several sources. The software of the invention controls costs, provides scheduling features and facilitates billing in such a way that many of the concerns of a project manager are far more manageable. While most software packages struggle with integrating and presenting similar types of information from several sources, the present invention conveniently provides an item-by-item breakdown allowing for detailed analysis that is unmatched by anything currently available in the construction industry.

BRIEF DESCRIPTION OF THE DRAWINGS

FIG. 2(a) illustrates material control tag information associated with an intelligent object.

FIG. 2(b) illustrates labor control tag information associated with an intelligent object.

FIG. 2(c) illustrates schedule tag information associated with an intelligent object.

FIG. 2(d) illustrates billing tag information associated with an intelligent object.

FIG. 4(a) illustrates various drop down menus that provide user selectable options for labor completion that are displayed in response to selecting a scoping option from an electronic drawing.

FIG. 5 is a screen print of a report screen for providing status by scope and filter for labor information.

FIG. 7 is a screen print of a report screen for providing status by scope and filter for material information.

FIG. 9 is a screen print of a report screen for providing status by scope and filter for scheduling information.

DESCRIPTION OF THE SPECIFIC EMBODIMENTS

Figure 1A:
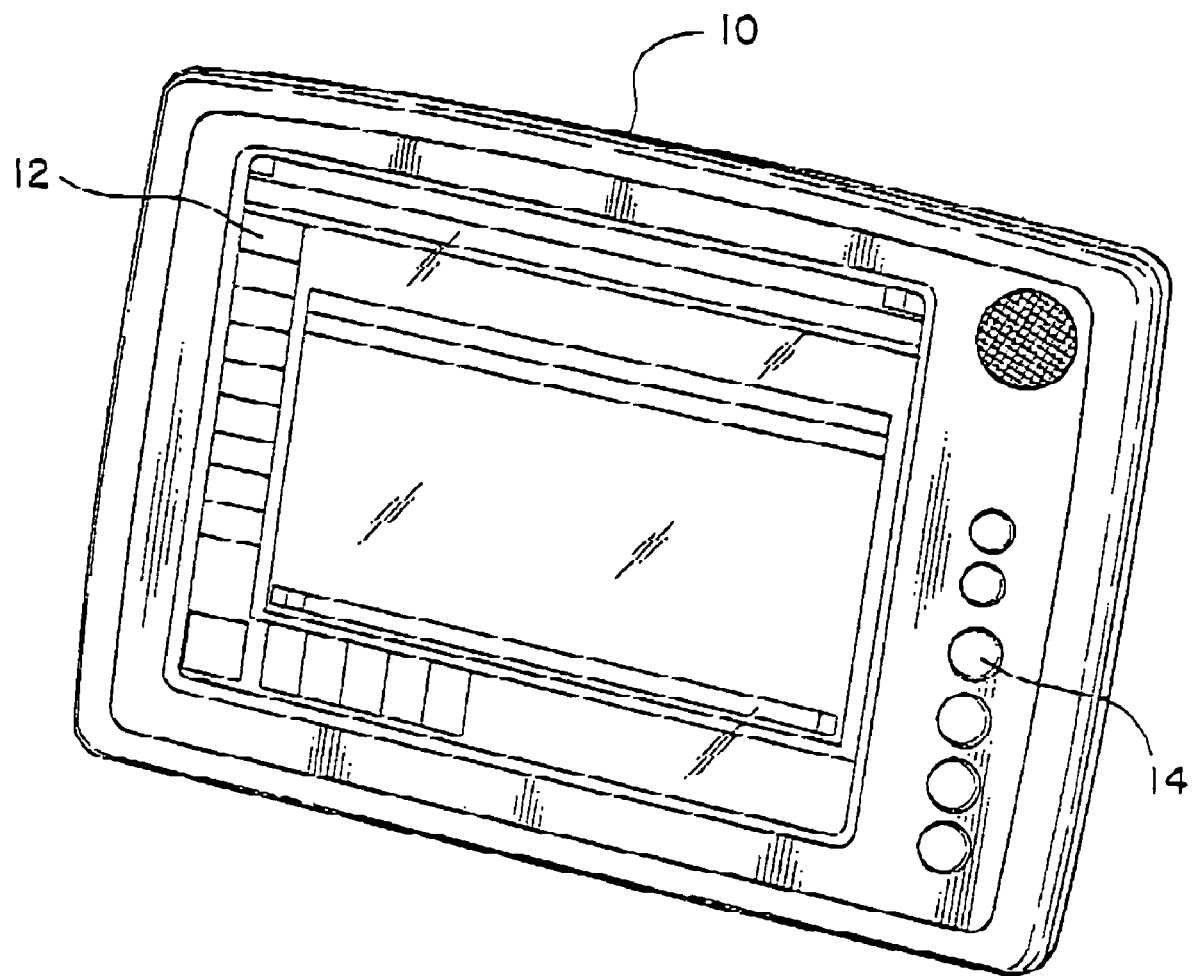
FIG. 1 illustrates an example of a typical input device of an embodiment of the invention.
Figure 2:
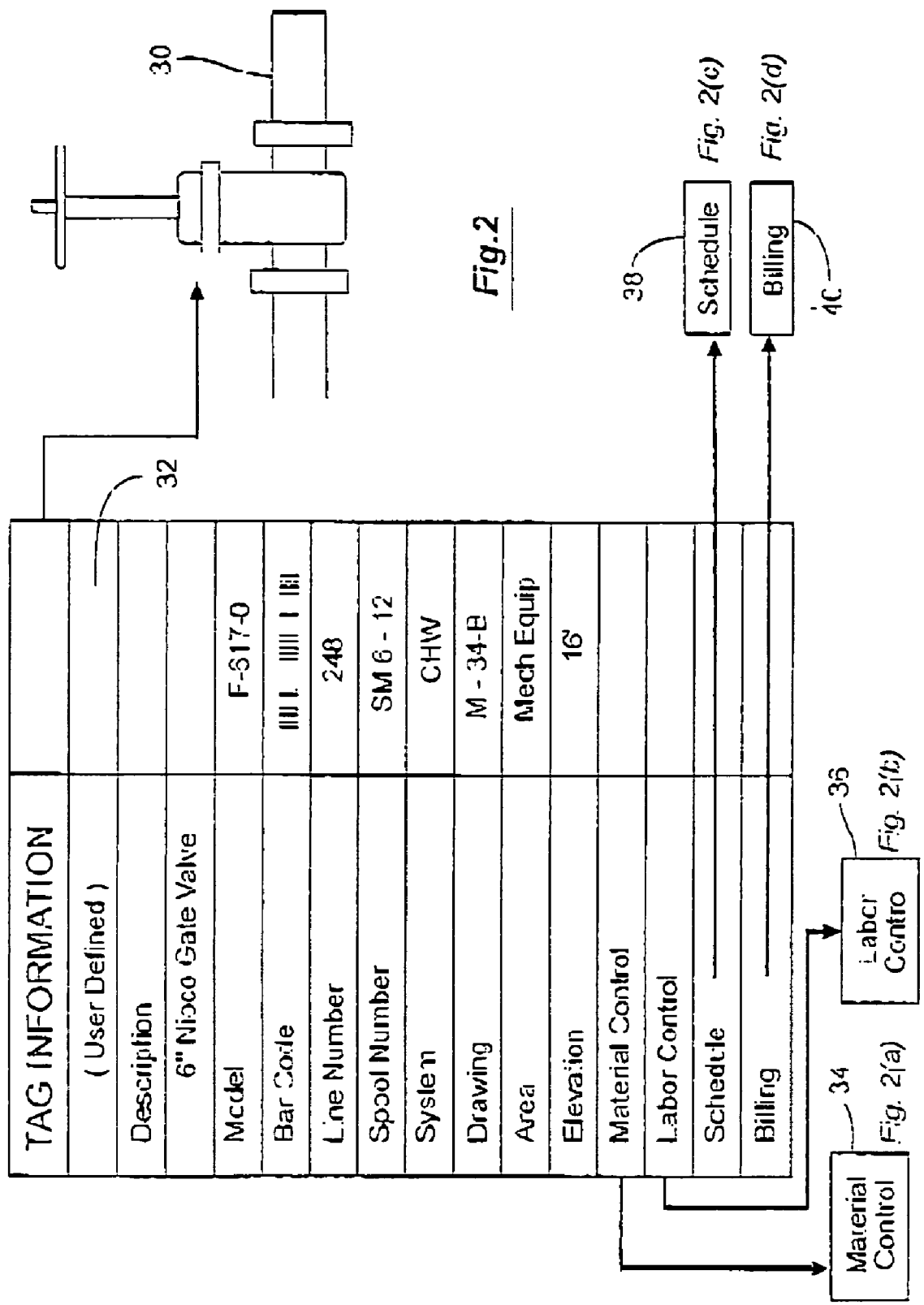
FIG. 2 illustrates tag information associated with an intelligent object.

The invention provides exemplary systems and methods that provide a construction site manager with the necessary tools to gather, manage and disseminate large amounts of information accompanying a construction project, including but not limited to labor, materials, scheduling and billing. The invention allows for the gathering of information from one or more data sources and/or one or more applications and thereafter producing both visual representations as well as printable reports showing the current status of various components of the construction project. Since the invention may be implemented in a network environment, the information, reports and status can be disseminated to one or more users. The information may be displayed such that the manager can readily determine the status of many different areas of the project, including the current material and labor status as well as the current and projected schedule. The term manager as used herein may refer to anyone with responsibilities regarding a construction project including, but in no way limited to, an owner, architect, engineer, contractor or project manager to name a few.

Although the invention is described herein using plumbing, specifically heating and cooling pipe runs, it will be appreciated that the invention may be used to provide construction management for a wide variety of items, including concrete, structural steel, walls, flooring, ceiling, piping, electrical, ductwork, glass, fixtures and the like. However, for convenience of discussion, the invention will be described in connection with heating and cooling pipe work. It should be appreciated that the invention is in no way intended to be limited as such.

There are numerous configurations for implementing the present invention. In one embodiment, the invention is implemented using a computer having computer readable memory, an entry device and a processor. The processor stores an electronic drawing in computer readable memory. In one embodiment, the electronic drawing may be a CAD drawing generated by any drawing package that can be adapted to receive associated intelligent objects, such as QuickPen Designer 3-D CAD manufactured and sold by QuickPen International, Inc. The electronic drawing is integrated with an estimating system, such as the AutoBid estimating system manufactured and sold by QuickPen International, Inc. More specifically, but not limited as such, the computer can be any computer such as a fixed PC, a portable PC, a hand-held computer, a wearable computer, a PDA, a bar code scanner or similar device.

In addition to operating as a single stand alone computer, the invention may be implemented in a network environment. For example, one location may serve as the central processor for storing the electronic drawings and the associated information. Several computers may access and communicate with the central processor, either through the Internet, an intranet or similar networking configuration allowing for multiple access points to the electronic drawings and associated information. In addition, a computer may access and communicate with the central processor using cellular or satellite technology. Therefore, the information may be updated and the drawing can be viewed from multiple locations.

There are many different software packages that may be used in conjunction with the present invention. As such, the present invention provides the flexibility to integrate with accounting software packages, estimating systems, labor/billing packages and/or data capture software packages. Advantageously, this flexibility allows the present invention to be used with many software packages with little modification on either end.

The present invention may acquire information from multiple sources. For example, information may be obtained from procurement applications, labor gathering devices, manual input, bar-coding of items or groups of items, or the like. Since the information may be gathered from multiple sources, the ability to integrate the information into a single location is a particular advantage of the present invention.

In a basic form, the present invention provides an electronic drawing with associated construction items. Each construction item graphically represents a single component for a construction project. For any given construction project, there may be a single electronic drawing or up to several hundred electronic drawings showing all the construction items to be installed. As one skilled in the art can appreciate, each drawing may depict a single construction item or several hundred construction items. In one embodiment, the electronic drawing may be a CAD drawing, but other types of electronic drawings may be used without departing from the intended scope of the invention.

A construction project and the accompanying electronic drawings can be organized and divided according to the particular needs of the construction project. Typically, the project is broken down into a series of drawings that represent the individual floors or floor plans. If greater detail is desired, the drawings for the individual floors can then be broken down into areas or zones within the floor. If even greater detail is preferred, the drawings may be broken down even further into individual components, which are the individual construction items. The present invention provides the necessary techniques for a level of detail ranging from a top level drawing individual floor or floor plans all the way down to an individual component drawing.

Unlike currently available electronic drawings, there may be several categories of user defined information associated with each construction item that can be stored in computer memory and retrieved on demand. According to the present invention, creating an association with detailed construction information transforms a simple construction item into an intelligent object. Therefore, the present invention provides methods and techniques for creating intelligent objects using construction items in a computer drawing. Each construction item does not lose any of its original qualities. Instead, the transformation provides additional information that makes it more useful to a construction project manager.

One particular advantage of the invention is the utilization of intelligent objects that provide detailed information about the item, such as estimated and actual labor, material delivery status, scheduling and the like. Such detailed information can provide an early warning of possible cost overruns and scheduling issues. As such, the project manager can possibly avoid unnecessary expenses or allocate costs to the proper individual(s) or organization responsible for the additional costs. For example, the detailed information can provide the underlying documentation to back a claim against a distributor that negligently created an unnecessary delay.

A construction manager can utilize intelligent objects to help efficiently direct a construction project thereby maximizing profitability. Since a click of an entry device at a single location can provide the manager with a wide variety of information, the manager does not have to take the time to personally extract the information from multiple sources. The information only has to be captured once before it can be disseminated to multiple locations and used in a variety of different ways. Moreover, the manager can manipulate and categorize the information quickly such that the resulting screen display or report provides an efficient use of the manager's valuable time. Therefore, the manager does not waste time gathering information since the collection of the information is preformed by a computer processor.

Another particular advantage of the present invention is the ability to scope both labor task completion status and material delivery status from a selectable option. A drop-down pick list is generated in response to updating either a labor task or a material status. The area of the update is entered into the pick list. The intelligence of the processor searches for the construction items located within the designated area entered into the pick list. The processor then automatically updates the status of the construction items in the defined area.

A contractor may enter the installation status for a particular labor task, which aids in the crediting of estimated labor to the project and allocation of actual labor data to the various construction items. For example, a contractor may enter status information into the pick list as described above or carry a PDA with a visual depiction of the computer drawing and associated intelligent objects. The contractor may then walk around the job site and visually inspect the items that have been installed. The PDA may be used to capture such information and store it in memory. The processor may then acquire the information from the PDA and update the stored information accordingly. As one skilled in the art can appreciate, a contractor may acquire material status information from other sources including but not limited to, capturing installed items on video, photographing installed items and manually entering, verbally calling out installed items and the like.

Another particular advantage of the present invention is the ability to allocate actual labor to the construction project and thereafter compare actual labor against estimated labor. Estimated labor information may be acquired from an estimating system. The information is usually based upon either an estimate or bid for a project or historical data in a database. This information is either acquired automatically or entered manually and subsequently stored in computer memory.

Actual labor data for the project may be either acquired directly from the field using a worker's time card or extracted from an accounting package. In one embodiment, a construction worker enters hours worked and the area worked at the end of a work day. It is unnecessary for the worker to allocate hours to a particular task. Instead, the worker simply enters the number of hours worked and the location worked, e.g. the second floor. Then, the labor information is transferred to a job cost program, which is typically an accounting software package. In one embodiment, instead of a traditional time card, a bar coded electronic time card may be used to automatically capture actual labor hours from a construction worker. The bar coding on the time card is associated with a particular task or area. The electronic time card therefore automatically breaks the hours worked into the area or task. The worker simply enters his or her hours on the proper electronic time card for an area or task, and the time card automatically allocates the hours to the area or task. In another embodiment, labor is captured in the field and added to a FieldTrac Module manufactured and sold by QuickPen International, Inc. Data may also be acquired from an accounting program and downloaded into a FieldTrac Module to achieve the same result.

Actual labor data for the project may be allocated to the construction project in a number of different ways. In one embodiment, the present invention extracts the actual labor information from a job cost program and allocates the actual labor information to the various job components based upon the material installation status. For example, if the contractor has indicated that certain hangers on the second floor have been installed in a given week, all of the labor allocated to that floor for the week is associated with hanger installation. Such an arrangement eliminates the need for detailed task codes that are currently used in most accounting programs.

Once the labor information is entered into the system, the processor flags the intelligent objects with visual indicators, such as color coding, which visually represent underlying status information. Since the visual indicators are easy to understand, a manager may quickly analyze the labor status information on the electronic drawing. If so desired, the manager may define a subset of a job for the generation of a report that provides greater detail.

Still another advantage of the present invention is the ability to monitor and track materials used for a construction project. Similar to labor information, material information may be acquired from an estimator program, CAD or purchasing program or a pricing service. This information is also stored in computer memory.

Materials may then be ordered and tracked once the underlying information for a construction item is entered into the system. A computer drawing displays the current material status using visual indicators. If so desired, the user may select a single construction item or a group of construction items for ordering. In response, the order is automatically sent to one or more suppliers or fabricators with the accompanying information such as part number and bar code number to name a few.

Once a shipment is received at the job site, the status of the shipment may be further tracked. For example, the recipient may conveniently scan the items using a hand-held bar code scanner. The information scanned into a hand-held scanner can be downloaded into computer memory. Since the bar code information is associated with a construction item, the computer can determine which items have been received and update accordingly. In addition, the computer can determine, track and update damaged items, backordered items or incomplete shipments to name a few. In another example, the material status update is entered into a pick list as described earlier. The status of the material and the corresponding location for installation are entered and automatically updated by the processor. However, as one skilled in the art can appreciate, other arrangements may be used instead of a bar code scanner without departing from the intended scope and coverage of the invention, such as visual inspection, manual entry or the like.

Yet another advantage of the present invention is the ability to automatically update scheduling information in response to changes in material and labor information. In response to labor and material issues, the processor can automatically update installation dates accordingly. For example, if a material shipment is delayed and therefore unavailable for a particular area, then labor is unnecessary for that part of the job and can be directed elsewhere. The installation date associated with the area effected would then be updated to reflect the change in status. In addition, scheduling can also prioritize and allocate incomplete material shipments. For example, if ten valves were ordered and only eight were received, the scheduler could prioritize where the eight valves should be allocated according to current scheduling information and available labor information. In any case, the electronic drawing reflects the current status of the installation. This information can be entered into a report based upon dates, areas, task codes and construction items to name a few.

Referring now to the drawings, the systems and methods of the invention will now be described in greater detail. FIG. 1 illustrates one possible system of associated components for implementing the present invention. The present invention, which also may be referred to herein as a Field Track system 1, may be coupled to a CAD system 3 and/or an estimating software package 2. Either CAD system 3 or estimating software package 2 may exchange data with Field Track system 1. In addition, a wireless computer 6 may be used to input data to Field Track system 1. CAD system 3 and estimating software package 2 may also be coupled to each other to facilitate the exchange of data. As illustrated, data may also be exchanged between Field Track system 1 and time card input 5 and/or accounting software package 4. As shown in expanded window 7, several possible approaches for displaying the data from Field Track system 1 include, but are in no way limited to, a laptop computer 8, a monitor 9 or a color coded drawing 11. It should be appreciated by one skilled in the art that some or all of the above referenced components may be connected via a LAN, WAN, wireless, web/ASP or the like.

Referring now to FIG. 1(a), an example of a flat screen computer system 10 used to input information and execute software of an embodiment of the present invention will be described. Computer system 10 may include a screen 12 and input controls 14. Computer system 10 is illustrated as portable, which allows for ease of use in the field. Computer system 10 may also be fitted with an antenna for wireless communication, which is not shown in FIG. 1.

Computer system 10 as shown in FIG. 1(a) is but one example of a computer system suitable for use with the present invention. Other configurations suitable for use with the present invention, such as a personal digital assistant (PDA), a hand-held computer, a bar code scanner or the like will be readily apparent to one of ordinary skill in the art. Suitable configurations may be adaptable for use in a wireless or satellite environment.

As stated previously, one embodiment of the invention utilizes a computer drawing having intelligent objects. The computer drawing can be any computer drawing sufficient to display construction items, including a CAD drawing, a CAD/CAM drawing, or any drawing from a software package. The present invention provides the capability for enhancing each object in a drawing by creating a more intelligent object by associating tag information.

FIGS. 2, 2(a), 2(b), 2(c) and 2(d) show an example of an intelligent object with associated tag information. For purposes of explanation, the invention is described in terms of a 6" Nibco Gate Valve 30. However, it will be appreciated that each item of a drawing may have similar tag information. As shown in chart 32, the user may assign many unique characteristics to the intelligent object. For example, object 30 is assigned a model number and associated bar code for material tracking purposes. Also shown are the system, area and the drawing identifiers for the item, which in the illustrated example are chill water (CHW), mechanical equipment (Mech Equip) and drawing M-34-B respectively.

The tag information also includes drill down information, in this case material control 34, labor control 36, schedule 38 and billing 40. Tag information is by its very nature user defined, so it can be entered manually or it can also be obtained automatically.

Material control information 34 contains, among other things, the current status of the intelligent object. In the illustrated example, object 30 is on back order. If the drawing were displayed and this part was in the drawing, it would be shown having a status identifier indicating the part was on back order. A manager can therefore quickly scan the drawing to immediately determine the respective status of the parts based upon the status identifier, which in the case of the illustrated embodiment is a highlight color.

Labor control information contains both the estimated labor unit, which is often obtained from an estimating program, and the work in place (WIP) for intelligent object 30, which in the illustrated example are 4.34 hours and 3.96 hours respectively. If this part was illustrated on the drawing according to labor, the respective labor task identifier would reflect the fact that it has completed the joint make up point of the process.

The invention is described hereinafter in terms of a CAD drawing integrated with an estimating system having intelligent objects that provide both displayable and printable information relating to the associated items, either individually or as groups. It should be readily apparent from the description that an estimating system may also be an integral part of a CAD drawing. Such information may include, but is not limited to, estimated and actual labor data, estimated and actual material data, current status information, completion information, scheduling information and the like. As one skilled in the art can appreciate, the invention is not limited to an electronic drawing integrated with an estimating system. For example, the invention could be embodied in an estimating system having a graphical takeoff with intelligent objects.

Figure 3:
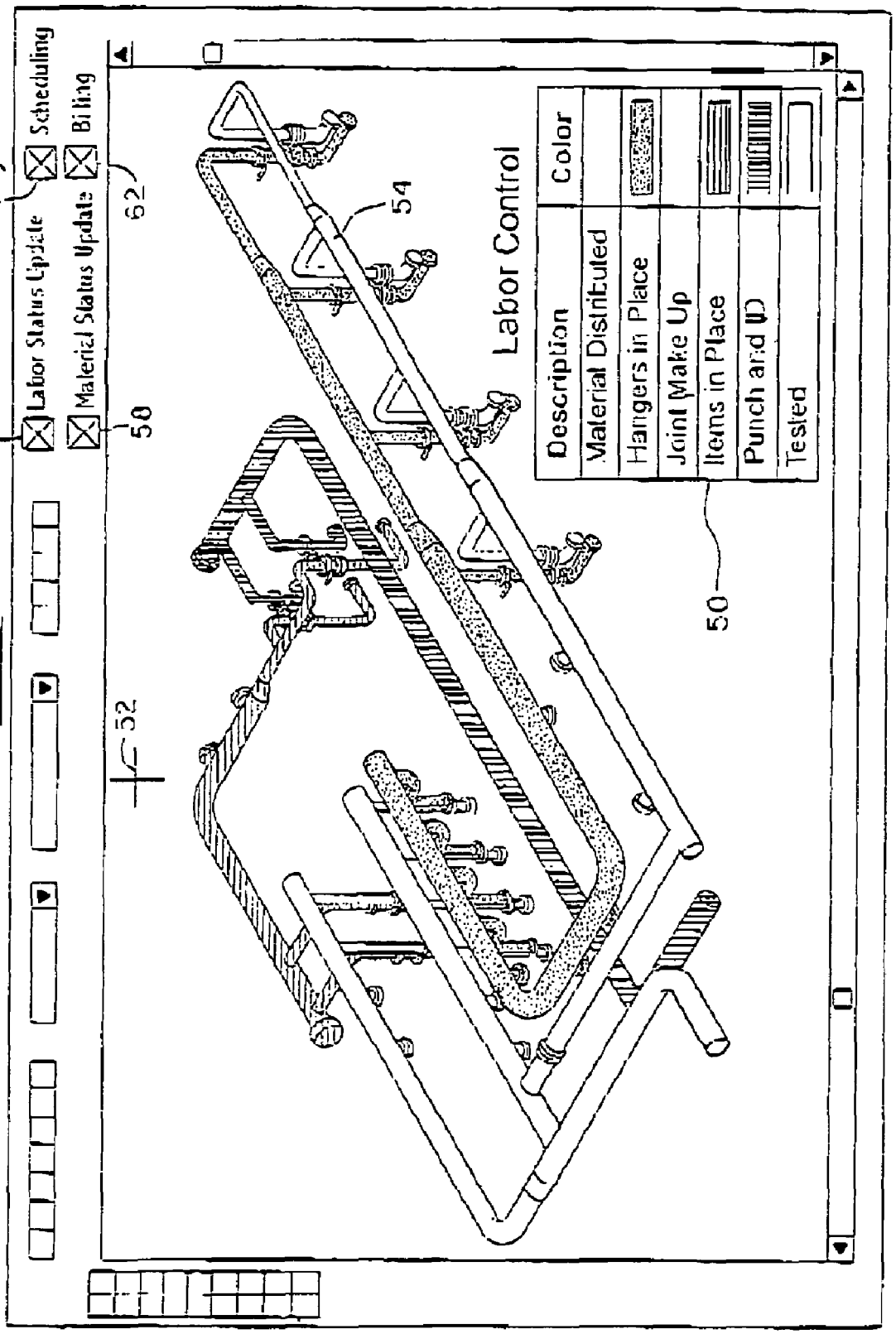
FIG. 3 illustrates a typical CAD drawing according to the present invention that displays associated tag information using color coding.

Referring now to FIG. 3, a specific example of a CAD drawing 48 with several intelligent objects 54 having associated tag information in accordance with the present invention is illustrated. In the illustrated example, labor information is shown for a pipe run. The intelligent objects contained in the drawing are given task identifiers, or color coding, (which for convenience of illustration are shown as different shading) according to their present completion status. For example, item 54, illustrated as unshaded, reflects construction item(s) that have reached the tested stage. Legend 50 illustrates a sample color scheme for the task identifiers that reflect the completion status with respect to labor control. These may include, for example, a yellow color for highlighting items that are in place and a blue color for highlighting items that are tested. Pointer 52 may be manipulated by a user to point and click on individual intelligent items or draw a box around a group of intelligent items to flag the items.

Labor status update button 56 allows a user to update the completion status for the labor tasks associated with the illustrated intelligent objects. In the illustrated example, selecting button 56 generates a labor status menu for selecting and updating the completion status of the construction items for the various labor tasks illustrated in legend 50. In a like manner, material status update button 58 allows a user to update the material status, scheduling button 60 allows a user to manipulate scheduling information and billing button 62 allows a user to manipulate billing information.

In FIG. 3, drawing 48 is a CAD drawing. However, any electronic drawing that can be manipulated may be used. In use, the intelligent objects are associated with tag data. Tag data may include, but is not limited to, labor information, material information and scheduling information, where scheduling information may be an estimated start date and an estimated completion date. Tag data may be automatically obtained or entered manually. The associated tag data is stored on a computer usable medium such as a server or database for future use.

To display the data, the user selects a portion of the drawing. To do so, the user may double click on a single intelligent item, drop down a pick list, draw a box around several intelligent items, click on a beginning point and an ending point or the like. A group of several intelligent items is referred to herein as a labor task group. The data associated with the selected intelligent object or objects are displayed.

Labor Tracking

The present invention provides labor tracking for organizing and monitoring the labor associated with various construction items. For example, estimated labor is received and stored by a labor module. Estimated labor may be based upon historical data received from an estimating software package, or it may be manually entered based upon an accepted bid or contract. The labor module of the invention provides techniques for storing the estimated labor information and also for associating the information with the various construction items.

A contractor may then update a labor task status for the project, which aids in the allocation of actual labor data and crediting of estimated labor for the various construction items. Typically, the various stages of labor are grouped and categorized according to labor tasks. Labor tasks divide a general labor event into specific tasks, which may start at material receipt and proceed to final inspection. Examples of specific tasks include labor events such as receiving an item, installing an item or testing the item to name a few. Since labor tasks are more detailed, they provide a more manageable way to handle labor status information as well as present more useful information than simple start and stop information.

In one embodiment, a contractor may enter information into a drop-down pick list to update labor task status. A contractor begins by selecting a labor task from a labor status menu. The selection of a labor task generates a drop-down pick list. The drop-down pick list displays the filtering options available to further specify the identity and location of a completed labor task. In other words, the filtering options define the respective area of the completed labor tasks. Once the contractor has defined the area, and specified which labor task(s) are complete, the invention automatically updates the information associated with the respective intelligent object(s). In response, the electronic drawing is updated showing the current status for the flagged items. Estimated labor for the completed labor task(s) are also credited to the construction project.

In another embodiment, a contractor may have a PDA with a visual depiction of the computer drawing and associated intelligent objects. In this way, the contractor may walk around the job site and visually inspect the items that have been installed. The PDA may be used to capture such information and store it in memory. The processor may then acquire the information from the PDA and update the stored information accordingly.

Periodically, actual labor is captured and entered into the labor module. The data capture of actual labor may be done automatically or manually. Typically, a construction worker enters hours worked and the area worked at the end of a work day. It is unnecessary for the worker to allocate hours to a particular task. In response, the present invention allocates the entered actual labor information to the various job components based upon the labor installation status entered into the drop-down pick lists or captured from the PDA. The module thereafter associates the actual labor information with the various construction items and stores the information on computer readable memory.

Once both actual labor and estimated labor are entered into the module, reports may be generated for a wide variety of comparisons. In addition, the electronic drawing displays graphical indicators that represent the labor status for the various construction items. A construction manager can quickly analyze the current labor status of the project.

Figure 4:
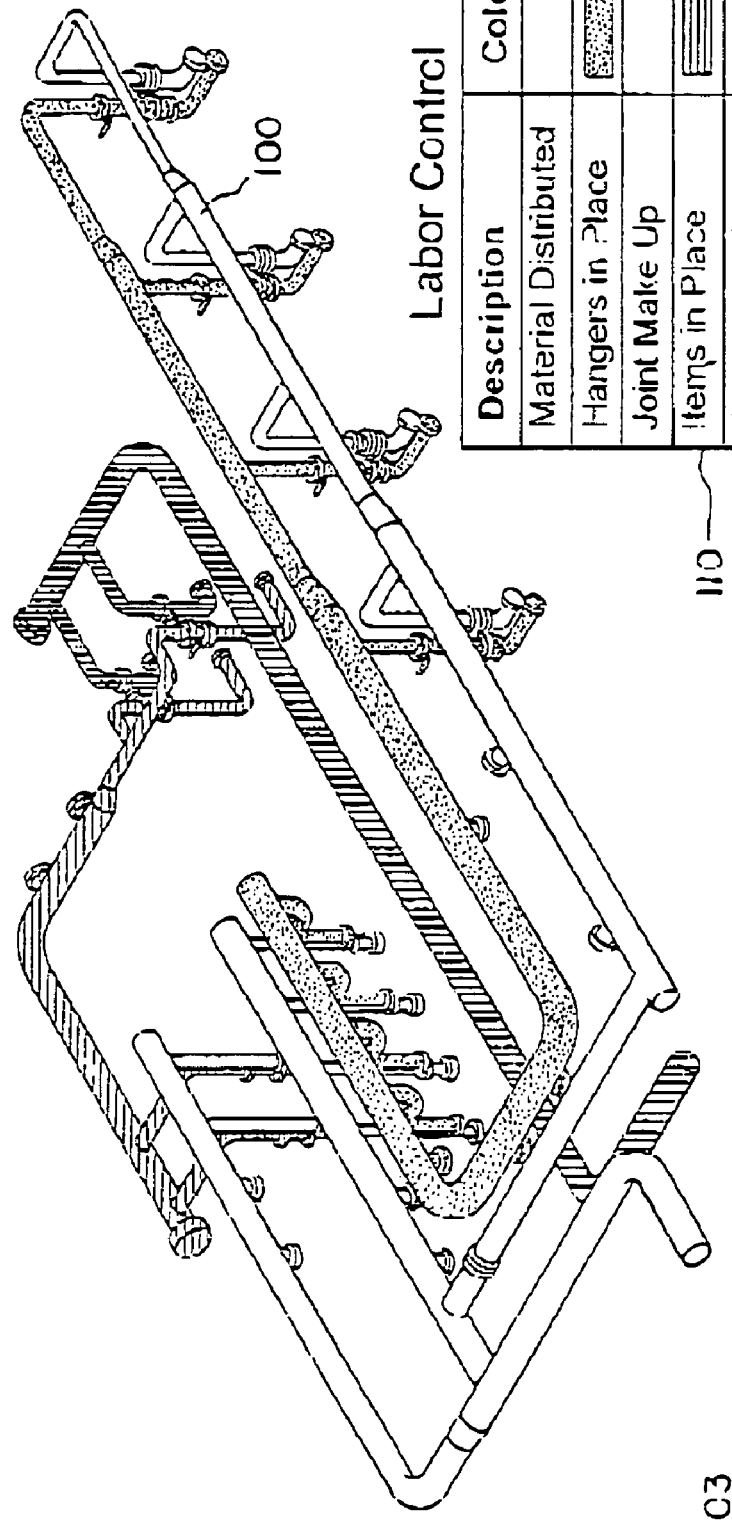
FIG. 4 illustrates a typical labor control drawing in accordance with the present invention that is color coded with flagged task identifiers that display the labor status for various intelligent objects.

FIG. 4 illustrates a typical labor control drawing 101 having several construction items 100 (in the form of intelligent objects) in accordance with an example of a labor module of the present invention. The drawing is shown as being color (or shaded) coded with flagged task identifiers to display the labor status for various intelligent objects. In the illustrated embodiment, the legend for the task identifiers 110 is in the lower right hand corner. Legend 110 quickly gives a user the necessary information to associate the color (or shade) with a labor status for an intelligent object 100. The ability to quickly evaluate labor is important for the construction project manager.

FIG. 4(*a*) shows a labor status menu 102 listing various labor tasks. Typically, labor status menu 102 is generated in response to selecting a labor status option from labor control drawing 101. In one embodiment, the labor status option is an intelligent button 103, shown in FIG. 4, that displays the labor status menu 102 in response to a user selection. Labor status menu 102 lists a labor status task list 104 with a corresponding selection means 109, such as an intelligent button or the like. In the illustrated example of FIG. 4(*a*), six labor task options are shown. Continuing with the illustrated example, the contractor selects one of the six options when the labor is completed for a labor task.

FIG. 4(*a*) illustrates drop-down pick list 105 displayed in response to a contractor selecting a task listed in labor task list 104 from labor status menu 102. Drop-down pick list 105 allows the contractor to pin-point the exact location of the completed labor task(s). Pick list 105 provides a "filter by" option to identify the general location of the completed labor task. In the illustrated example, a user may select a location such as a drawing, floor, line, system or zone to name a few. One or more filtering options may be selected.

Continuing, FIG. 4(*a*) illustrates a second menu 106 generated in response to a contractor choosing a "filter by" option from drop-down pick list 105. The second menu further specifies and defines the "filter by" choice from drop-down pick list 105. In the illustrated example, the general location "drawing" is chosen from pick list 105. In response, second menu 106 requests entry of the specific drawing location for the completed labor task.

As shown in FIG. 4(*a*), a second menu 107, 108 may be generated and displayed for each "filter by" option selected from drop-down pick list 105. The general location "system" is selected from pick list 105. Second menu 107 requests entry of the specific system for the completed labor. Continuing, the general location "zone" is selected from pick list 105. In response, second menu 108 is generated requesting entry of the particular zone for the completed labor information. In accordance with the present invention, more than one "filter by" option may be selected and further scoped to accurately specify and delineate the location of the completed labor task(s).

For example, assume the contractor has determined that hangers are installed on the drawing M1 for the chill water system in the mechanical room. The contractor first selects the hanger option from labor status menu 105. Next, the contractor defines the area where the hangers are installed. For the current example, the contractor selects drawing, system and zone from the drop-down pick list. In response, a second menu is displayed for each selection in status menu 105. The contractor selects drawing M1, CHW (chill water) and Mech Room (mechanical room) from the corresponding second menu options. When the contractor is satisfied the designated area is properly defined using selection status menu 105, the processor updates the association data. In this case, the processor searches and locates all hangers in this defined area and updates the intelligent objects to indicate they are installed. The identifiers on the electronic drawing are updated accordingly as well as crediting the estimated hours to the project.

Continuing with the example, assume further that the invention extracts 100 actual labor hours from a job cost program and associates the extracted 100 hours with the installation of the hangers on drawing M1 for the chill water system in the mechanical room. Moreover, assume for purposes of this example that the number of estimated hours for the installation of the same hangers was 110 hours. Since the processor has identified all the hangers associated with the defined area and flagged them as complete with respect to labor, the 110 hours of estimated labor becomes 110 hours of credited labor. Credited labor hours will always equal estimated labor hours for a labor task(s) that is flagged in an area or zone as complete. In this example, the flagged area has used 100 hours of actual labor for a job that has allocated 110 hours of estimated labor (which is 110 credited labor hours since the labor is complete). The manager is pleased since the job was over estimated by 10 hours, which in this limited example represents 10 hours of additional profit.

It should be noted that this type of information can be used to structure and adjust future bids and also to update data in an estimating system database. For example, if subsequent jobs continue to come in several hours over the bid amount for the installation of hangers, the existing estimating data can be modified to reflect this continued differential. This improved data would then be saved for future bids. As a result, subsequent bids after the update would be closer to the mark with respect to labor for installation of hangers.

FIG. 5 illustrates an example of how various reports relating to labor may be generated for the items displayed in FIG. 4. The reports may be generated using a graphical user interface 120 having various places to enter data and specify parameters. The user is given various choices to further narrow how the report is displayed. For example, a scope region 170 is provided to permit by a user to designate a drawing number, a room, a particular grouping of construction items or the like. An item filter region 180 may be used to show all items or any chosen subset of items. A report filter region 150 may be used to indicate the type of report the user wishes to generate. In the illustrated example, a user has chosen to illustrate a comparison of actual labor to estimated labor, however, any number of report filters can be used, including but not limited to drawing, floor, line, symbol, system, trade or zone to name a few.

TABLE 1

Labor Report

Reporting Date: Jun. 24, 2000
Scope: Drawing M-2: CHW: Mech Rm    Item
                                     Filter: All
                            Report Filter: Estimated To
                                     Actual

| TASK | Estimated Hours | Credited Hours | Actual Hours | Hours Ov/Un | % Ov/Un |
|---|---|---|---|---|---|
| Material Distribution | 97 | 97 | 86 | −11 | −13% |
| Item in Place | 302 | 218 | 256 | 38 | 15% |
| Joint Make Up | 195 | 167 | 178 | 11 | 6% |
| Test | 19 | 0 | 0 | 0 | |
| Punch and I.D. | 32 | 0 | 0 | 0 | |
| Total | 645 | 482 | 520 | 38 | 7% |

Table 1 illustrates one example of a labor report generated by a user. The user has selected a particular report filter for comparing actual labor to estimated labor. In addition, the user has specified a scope of drawing M-2, chill water piping (CHW) and the mechanical room (Mech Rm). The scope may be used to narrow or expand the location of the intelligent objects the user wishes to view in a report.

Estimated hours are displayed in column 2 of Table 1 for the various Tasks in column 1. The estimated labor hours may be captured automatically from an estimating program, however, they may be obtained elsewhere. As shown, actual hours are displayed in column 4 of Table 1 for the various Tasks in column 1. Actual hours may be manually entered into the system or they may be obtained from another information source. For example, actual hours may be manually entered from time cards or automatically obtained from an accounting program or an electronic time card module. Credited hours shown in column 3 of Table 1 are hours that have been credited to the particular task of the project in column 1. When the task is complete, the credited hours will equal the estimated hours.

Table 1 represents a simple yet effective example of how the invention can be used by a construction project manager to evaluate labor for a construction project. As is readily apparent from the illustrated table, the information is brief, accurate and easy to read and analyze. In the illustrated example of Table 1, a manager can look at the estimated labor and the actual labor to determine the efficiencies and inefficiencies for the specified scope. If he/she determines the area to be overly efficient, labor could possibly be directed elsewhere to cure efficiencies in other locations. Conversely, if labor is found to be inefficient in the area specified by the scope, such inefficiencies may be addressed.

TABLE 2

Labor Status Report

Reporting Period May 21, 2000 through Jun. 28, 2000   Report Date   Jun. 29, 2000
Project 347-DF
IBM Fab 8
Scope By:   System; Drawing; Zone

| System | Drawing | Area/Zone | Complete Status | Estimated Hours | Estimated Hours To Complete | Projected Hours to Complete | Additional Hours to Complete | Credited Hours | Actual Hours | % Labor Used | Hours Ov/Un | % Ov/Un |
|---|---|---|---|---|---|---|---|---|---|---|---|---|
| CHW | M-2 | Mech Rm |  | 645 | 22 | 25 | 22 | 623 | 702 | 109% | 79 | 11% |
| HHW | M-2 | Mech Rm |  | 523 | 114 | 109 |  | 409 | 417 | 80% | 8 | 2% |
| CDW | M-2 | Mech Rm |  | 156 | 0 | 0 | 24 | 156 | 187 | 120% | 31 | 17% |
| CHW | M-3 | East Wing | Yes | 421 | 0 | 0 |  | 421 | 411 | 98% | −10 | −2% |
| HHW | M-3 | East Wing | Yes | 391 | 0 | 0 |  | 391 | 423 | 108% | 32 | 8% |
| CHW | M-4 | West Wing |  | 488 | 488 | 488 |  |  |  | 0% | 0 |  |
| HHW | M-4 | West Wing |  | 392 | 392 | 392 |  |  |  | 0% | 0 |  |
| Total |  |  |  | 3016 | 1016 | 1014 | 46 | 2000 | 2140 | 66% | 140 | 6% |
| Hours to complete current productivity |  |  |  |  |  | 1060 |  |  |  |  | 138 |  |
| Hours to complete current productivity - Based on % Over/Under |  |  |  |  |  | 1077 |  |  |  |  | 201 |  |
| Cost Per Hour | $45.00 |  |  |  |  | $48,463 |  |  |  |  | $9,043 |  |

Estimated Hours   From Connect - Est
Credited Hours   From FieldTrac
Actual Hours   From FieldTrac Time Capture or Job Cost/Payroll Table 2 shows a labor status report, which provides a greater amount of detail than the labor report of Table 1. In Table 2, the user again specifies the scope of the report. In this case, the user has chosen to view labor data by System; Drawing; Zone. As such, a report is generated as shown in Table 2 showing all the systems, the corresponding drawing and the area or zone where the system is located.

The information provided in Table 2 displays estimated hours, actual hours and credited hours similar to Table 1. However, Table 2 provides additional information that assists the project manager in assessing the status of labor for the chosen scope. Table 2 provides a completion status column that allows for a manager to quickly assess which areas are done and ready for billing. Table 2 also provides various estimations and projections for the number of labor hours required to complete a particular system. This information allows a manager to determine what locations still require additional labor, which allows the manager to take quick and decisive corrective action. In addition, the report of Table 2 provides the user with a % labor figure and % over/under figure, which gives the user a quick answer to the efficiency for a particular system.

TABLE 3

Labor Task Code Report

Reporting Period:   May 21, 2000 through Jun. 28, 2000   Report Date:   Jun. 29, 2000
Project 347-DF
IBM Fab 8
Scope By:   Drawing M-2

| Task | Code | Complete Status | Estimated Hours | Credited Hours | Actual Hours | % Complete | Hours Ov/Un | % Ov/Un |
|---|---|---|---|---|---|---|---|---|
| Material Distribution | 10 | Yes | 198 | 198 | 178 | 100% | −20 | −10% |
| Hangers | 20 | Yes | 394 | 394 | 431 | 100% | 37 | 9% |
| Layout/Inserts | 21 |  | 0 | 0 | 0 | 0% | 0 | 0% |
| Item In Place | 30 | Yes | 331 | 331 | 356 | 100% | 25 | 8% |
| Joint Make Up | 40 |  | 295 | 238 | 277 | 81% | 39 | 16% |
| Test | 50 |  | 40 | 27 | 33 | 68% | 6 | 0% |
| Punch & I.D. | 60 |  | 66 | 0 | 31 | 0% | 31 | 0% |
| Total |  |  | 1324 | 1188 | 1306 | 90% | 118 | 10% |

Credit Hours
Actual Hours   from FieldTrac Time Capture or Job Cost/Payroll

Table 3 shows a labor task code report, which provides a greater amount of completion detail than the labor reports of Table 1 and Table 2. In Table 3, the user again specifies the scope of the report. In this case, the user has chosen to view labor data by a particular drawing. As such, a report is generated as shown in Table 3 showing all the Tasks for drawing M-2 along with the corresponding task codes. The Labor Task Code Report is another way of visually presenting the hours and completion status. In this case, the report shows the % complete status for the Tasks of column 1 for a particular drawing. Such information is helpful for the manager for the purpose of quickly assessing what tasks still need attention.

As shown in the lower left hand corner of Table 3, the credited hours of column 5 may be obtained from a second application. Similarly, the actual hours shown in column 6 may also be captured from a second system or application, which is shown in the illustrated example as Job Cost/Payroll. As one skilled in the art can appreciate, the examples given are in no way intended to limit the scope of the invention to the recited applications and as such any suitable application may be used in place of the examples given.

TABLE 4

Hours to Complete Report

Reporting Period: May 21, 2000 through Jun. 28, 2000   Report Date: Jun. 12, 2000
Project 347-DF
IBM Fab 8
Scope By: Drawing M-2

| Task | Code | Complete Status | Estimated Hours | Credited Hours | Unused Hours | Projected Additional Hours | Hours to Complete |
|---|---|---|---|---|---|---|---|
| Material Distribution | 10 | Yes | 198 | 198 | 0 | 0 | 0 |
| Hangers | 20 | Yes | 394 | 394 | 0 | 0 | 0 |
| Layout/Inserts | 21 | | 0 | 0 | 0 | 0 | 0 |
| Item In Place | 30 | Yes | 331 | 331 | 0 | 0 | 0 |
| Joint Make Up | 40 | | 295 | 238 | 57 | 38 | 95 |
| Test | 50 | | 40 | 27 | 13 | 8 | 21 |
| Punch & I.D. | 60 | | 66 | 0 | 66 | 0 | 66 |
| Total | | | 1324 | 1188 | 136 | 46 | 182 |
| Credit Hours | From FieldTrac | | | | | | |
| Actual Hours | From FieldTrac Time Capture or Job Cost/Payroll | | | | | | |

Table 4 illustrates the same information as Table 1, with the addition of unused hours for a particular task as well as projected additional hours for a task. The user has selected to view the information by drawing M-2, but other scopes may be chosen as well. The information of Table 4 allows a construction manager to assess over/under labor hours. As such, the manager can catch the efficiencies or inefficiencies early enough to rectify the potential problem.

TABLE 5

Work in Place (WIP) Report

Reporting Period May 21, 2000 through Jun. 28, 2000   Report Jun. 29, 2000
Date
Project 347-DF
IBM Fab 8
Scope By: All Drawings

| Drawing | Complete Status | Estimated Hours | Credited Hours | Actual Hours | % Complete |
|---|---|---|---|---|---|
| M-1 | | 723 | 629 | 705 | 87% |
| M-2 | | 1324 | 1188 | 1306 | 90% |

TABLE 5-continued

Work in Place (WIP) Report

Reporting Period May 21, 2000 through Jun. 28, 2000   Report Jun. 29, 2000
Date
Project 347-DF
IBM Fab 8
Scope By: All Drawings

| Drawing | Complete Status | Estimated Hours | Credited Hours | Actual Hours | % Complete |
|---|---|---|---|---|---|
| M-3 | Yes | 812 | 812 | 187 | 100% |
| M-4 | | 880 | 0 | 0 | 0% |
| M-5 | | 478 | 196 | 215 | 41% |
| M-6 | | 488 | | | 0% |
| M-7 | | 392 | | | 0% |
| Total | | 5097 | 2825 | 2413 | 55% |
| Credit Hours | From FieldTrac | | | | |
| Actual Hours | From FieldTrac Time Capture or Job Cost/Payroll | | | | |

Table 5 illustrates a WIP report, which provides a quick view of the completion status for the various construction items. In the illustrated example, all the drawings for the construction project are shown. The scope of the table may be changed to view particular locations or groups of construction items.

There are numerous additional filters that are not illustrated but are equally as effective for displaying data. The additional examples are not shown for sake of brevity, but one skilled in the art could list numerous combinations of scope, items and the corresponding information to view in a report.

Material Tracking

The invention further provides material tracking for the materials used for the construction project. For example, material information relating to the type of item to be installed is received and stored by a material module. The module of the invention thereafter provides techniques for conveniently tracking the material from ordering through installation and billing.

More particularly, the material module allows a contractor to track material delivery status from an electronic drawing. Specific material information associated with each item, such as a bar code, a material item identifier and the like is entered into the system. A contractor can order material items by simply selecting any intelligent item or group of intelligent items from the electronic drawing. In one embodiment, the module is integrated with a purchase order software package that generates an order when intelligent items are selected.

In one embodiment, a contractor may enter information into a drop-down pick list to update material status. First, a contractor selects a material status from a material status menu. The selection of a material status generates a drop-down pick list. The drop-down pick list displays the filtering options available to further specify the identity and location for the material status. Once the contractor has defined the area, and specified the material status, the invention automatically updates the information associated with the respective intelligent object(s). In response, the electronic drawing is updated showing the current status for the flagged items. In one embodiment, the items in an electronic drawing are color coded according to their status.

In another embodiment, when materials are received, the corresponding bar code is scanned by a bar code scanner or other methods of flagging. The status information is automatically sent to the material module. The processor may be used to update the information, which is reflected in the electronic drawing. A quick visual inspection of the electronic drawing provides simple and up-to-date information regarding material status. As one skilled in the art can appreciate, other methods of capturing material status may be used without departing from the intended scope of the invention.

Figure 6:
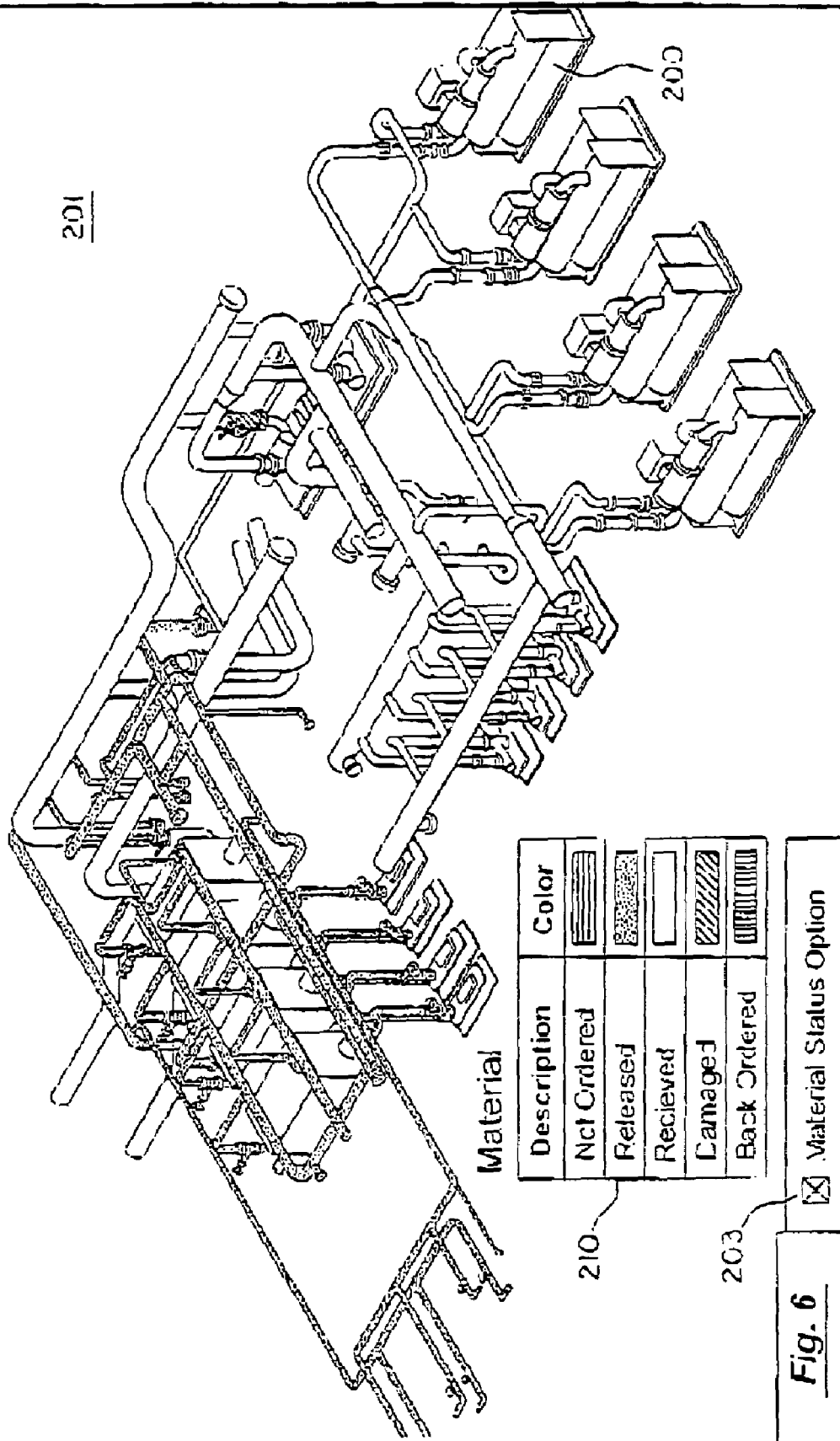
FIG. 6 illustrates a typical material control drawing in accordance with the present invention that is color coded with flagged task identifiers that graphically display the material status for various intelligent objects.

For example, FIG. 6 illustrates a typical material control drawing 201 having several construction items 200 in accordance with the invention. The drawing is shown as being color (or shaded) coded with flagged task identifiers to display the material status for various intelligent objects. In the illustrated embodiment, the legend for the task identifiers 210 is in the lower left hand corner. Legend 210 quickly gives a user the necessary information to associate a color with a material status for an intelligent object 200. For example, legend 210 may indicate items that are on back order or items that have been damaged. The status may easily be displayed because each item is an intelligent object having the associated status information.

Figure 6A:
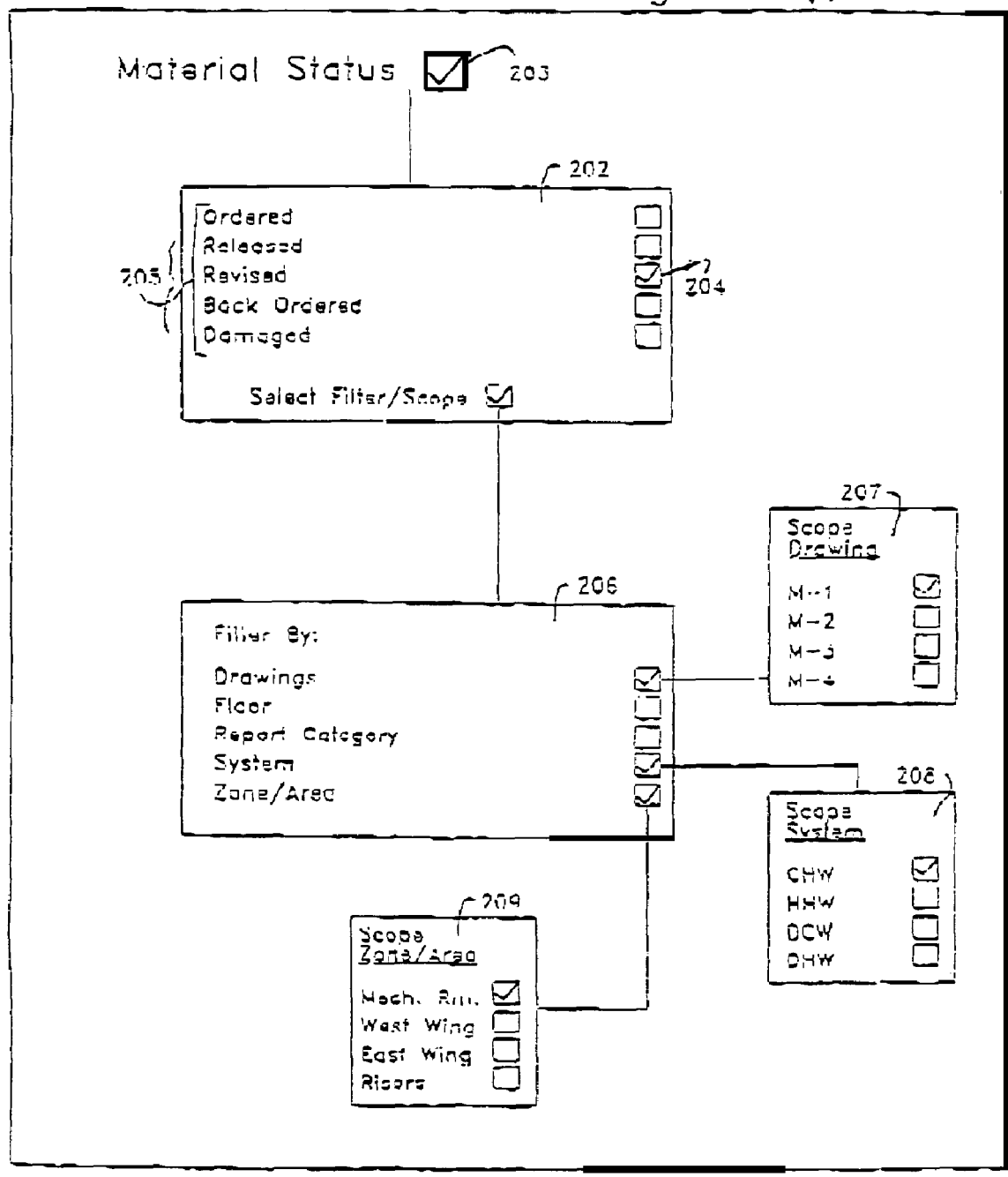
FIG. 6(a) illustrates various drop down menus that provide user selectable options for various material status conditions that are displayed in response to selecting a scoping option from an electronic drawing.

FIG. 6(a) shows a material status menu 202 listing various material status options. Typically, material status menu 202 is generated in response to selecting a material status option from material control drawing 201. In one embodiment, the material status option is an intelligent button 203, shown in FIG. 6, that displays the material status menu 202 in response to a user selection. Material status menu 202 lists a material status list 205 with a corresponding selection means 204, such as an intelligent button or the like. In the illustrated example of FIG. 6(a), five status options are shown. Continuing with the illustrated example, the contractor selects one of the five options when the material status changes.

FIG. 6(a) illustrates a drop-down pick list 206 displayed in response to a contractor selecting a status item listed in material status list 205 from material status menu 202. Drop-down pick list 206 allows the contractor to pin-point the exact location of the updated material status. Pick list 206 provides a "filter by" option to identify the general location of the material status update. In the illustrated example, a user may select a location such as a drawing, floor, line, system or zone to name a few. One or more filtering options may be selected.

Continuing, FIG. 6(a) illustrates a second menu 207 generated in response to a contractor choosing a "filter by" option from drop-down pick list 206. The second menu further specifies and defines the "filter by" choice from drop-down pick list 207. In the illustrated example, the general location "drawing" is chosen from pick list 206. In response, second menu 207 requests entry of the specific drawing for the updated material status.

As shown in FIG. 6(a), a second menu 208, 209 may be generated and displayed for each "filter by" option selected from drop-down pick list 206. The general location "system" is selected from pick list 206. Second menu 208 requests entry of the specific system for the updated material status information. Continuing, the general location "zone" is selected from pick list 206. In response, second menu 209 is generated requesting entry of the particular zone for the updated material status information. In accordance with the present invention, more than one "filter by" option may be selected and further scoped to accurately specify the location of the updated material status information.

For example, assume that valves have been received for drawing M-1 for the chill water system in the mechanical room. The contractor first selects the received option from material status menu 202. Next, the contractor defines the area where the valves are to be installed. For the current example, the contractor selects drawing, system and zone from the drop-down pick list. In response, a second menu is displayed for each selection in material status menu 206. The contractor selects drawing M-1, CHW (chill water) and Mech Room (mechanical room) from the corresponding second menu options. When the contractor is satisfied the designated area is properly defined using selection status menu 206, the processor updates the association data. In this case, the processor searches and locates all valves in this defined area and updates the intelligent objects to indicate they are received. The identifiers on the electronic drawing are updated and color coded accordingly to reflect the change in material status.

The user may order the material shown on the material control drawing 201 simply by clicking a mouse on a construction item, drawing a box around construction items to be ordered, specifying a start point and an end point in a run of material or the like. The information is sent to an ordering system that places the material order.

FIG. 7 illustrates an example of how various reports relating to material may be generated for the items displayed in FIG. 6. FIG. 7 illustrates how a report may be generated using a graphical user interface 220 having various places to enter data and specify parameters. For example, for each item in column 270, the ordered and not ordered data may be entered as shown in columns 240 and 250. In another embodiment, material information can be acquired and entered from a bar code scanner. A scanner identifies the material and then allows for a user to enter the status information into the scanning device. This information is then stored on a computer readable medium for future use.

In addition, a user is given various choices to further narrow how a report is displayed. For example, a scope region 280 may be chosen by a user, and may designate a drawing number, a room, a particular grouping of construction items or the like. An item filter 260 may be used to show all items or any chosen subset of items. A status filter 290 indicates the type of material status report the user wants to generate. In the illustrated example, a user has chosen to illustrate all materials ordered but not received, however, any number of status filters may be used.

TABLE 6

Material not Received Report

Reporting Date: Jun. 24, 2000
Scope: Drawing M-2      Status Filter: Not Received      Item Filter: All

| Item | Line # | Not Ordered | Ordered | On Hold | Released | Received | Back Ordered | Damaged |
|---|---|---|---|---|---|---|---|---|
| 6" Nibco Valve | 248 | | 17954A | | Yes | | | |
| 4" Nibco Valve | 311 | | 17954A | | Yes | | | |
| 6x6x4 Tee | 346 | Yes | | | | | | |
| 6x6x3 Tee | 386 | Yes | | | | | | |
| 8" Elbow | 429 | | | 1854A | | Yes | | |
| CHJ-1 Trane Chiller | 1238 | | | 2147A | | | | Yes |

Data Link to Purchase Order Module

Table 6 illustrates an example of a report showing materials that have not been received. The chosen scope for the illustrated example is drawing M-2. The chosen status filter is "not received" and the item filter is set to "all items." Any number of combinations are available to the user. As shown, status information for the various items in column 1 that have not been received are displayed. The construction manager can analyze the various columns to determine the status of the particular item.

TABLE 7

Material Ordered Report

Report Date:       Jul. 23, 2000
Scope: Drawing M-2                Status Filter: Ordered    Item Filter: Valves

| Item | Line # | P.O. Number | Date Ordered | Scheduled Shipping Date | Carrier | Shipping Number |
|---|---|---|---|---|---|---|
| 6" Nibco Valve | 248 | 17954A | Jun. 14, 2000 | Jul. 24, 2000 | | |
| 4" Nibco Valve | 311 | 17954A | Jun. 14, 2000 | Jul. 10, 2000 | Roadway | 283976-FL |

Data Link to Purchase Order Module

Table 7 is a detailed example of a material ordered report. The user has specified all valves that have been ordered for drawing M-2. As such, the information returned provides information such as order date, scheduled shipping date, carrier information and shipping number, if available, and the like.

TABLE 8

Material Work in Place (WIP)

Report Date: Aug. 09, 2000
Scope: Drawing M-2      Status Filter: Completed    Item Filter: All

| Item | Line # | Received | Billing Storage | Billing Date | W.I.P. Completed | Billing W.I.P. | Billing Date | Retention | Billing Date |
|---|---|---|---|---|---|---|---|---|---|
| 4" 90 Carbon Steel | 126 | May 23, 2000 | $17.00 | May 30, 2000 | Jul. 16, 2000 | $32.30 | Jul. 30, 2000 | | |
| 4" Carbon Steel Pipe | 127 | May 23, 2000 | $36.00 | May 30, 2000 | Jul. 16, 2000 | $68.40 | Jul. 30, 2000 | | |
| 4" Weldneck Flange | 128 | Jun. 11, 2000 | $76.00 | Jun. 30, 2000 | Jul. 16, 2000 | $144.40 | Jul. 30, 2000 | | |
| 4" Nibco Valve | 129 | Jun. 12, 2000 | $456.00 | Jun. 30, 2000 | Jul. 16, 2000 | $866.40 | Jul. 30, 2000 | | |
| 4" Weldneck Flange | 130 | Jun. 11, 2000 | $76.00 | Jun. 30, 2000 | Jul. 17, 2000 | $144.40 | Jul. 30, 2000 | | |
| 4" Carbon Steel Pipe | 131 | May 23, 2000 | $36.00 | May 30, 2000 | Jul. 17, 2000 | $68.40 | Jul. 30, 2000 | | |
| 4" 90 Carbon Steel | 132 | May 23, 2000 | $36.00 | May 30, 2000 | Jul. 17, 2000 | $68.40 | Jul. 30, 2000 | | |
| Total To Date | | | $733.00 | | | $1,392.70 | | | |

Labor Task Code - Action
Billing Module
Data Link to Purchase Order Module

Table 8 shows material work in place (WIP), which is important for billing purposes. Once material has been received on the job site, it is desirable to transfer the cost to the project. The above example shows all items that have been completed for drawing M-2. Two columns are important on this table, the received date and the WIP completed date. If the item is received, storage costs should be billed to the project. Then, once the item is completed, as indicated by the WIP completion date, the cost of the material including associated labor should be billed. As such, the construction project manager can quickly scan this table to make sure the costs are being billed to the appropriate locations at the appropriate times.

It should be appreciated that the information illustrated in a generated report for both labor and materials is the same as the information represented visually in a drawing. More particularly, the information shown in a generated table may also be visually represented as a color coded object on a drawing. For example, a contractor may generate a report on areas that are over or under on labor. In response to generating a report, the visual on-screen representation of the same information is updated as well. A contractor may then page through various on-screen drawings while simultaneously evaluating corresponding hard copies of generated reports.

Schedule Tracking

The invention further provides schedule tracking for allocating labor and materials in response to start dates and completion dates. For example, at the beginning of a construction project, dates are tentatively set for the completion of various phases of the construction project and entered into a scheduling module. The module of the invention provides techniques for recognizing scheduling problems, for example late materials shipments and labor overruns. In response to the problems, the module automatically updates any scheduling information in response to any delays.

Currently, scheduling for a construction project is difficult and time consuming since available methods rely upon imperfect and sometimes inaccurate information. The present invention automatically updates scheduling information based on both accurate labor and materials information entered into the system. Therefore, the scheduling of the present invention is generated from up-to-date and highly accurate information, which allows a contractor to be reasonably assured that decisions are based on sound data.

Figure 8:
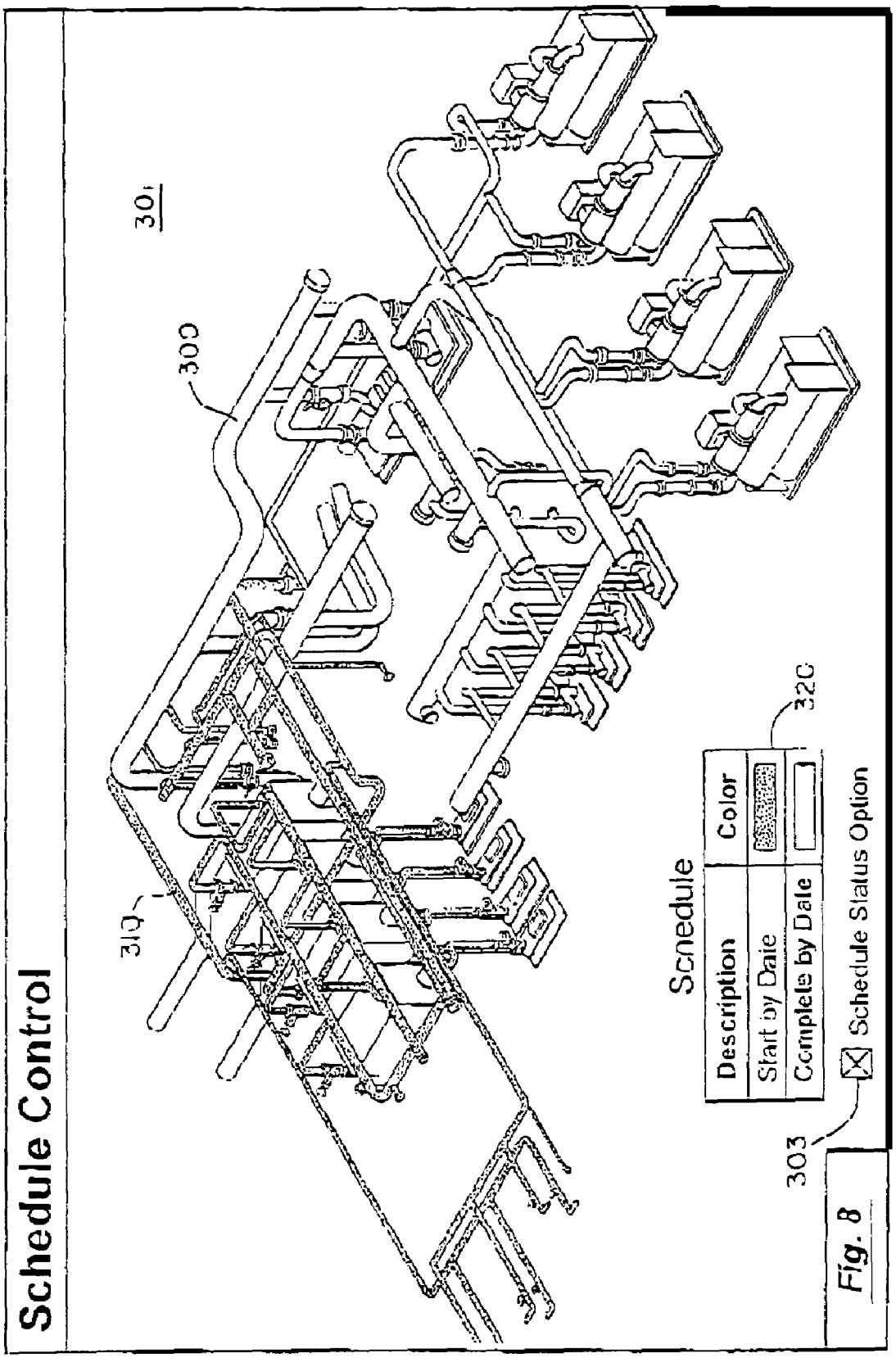
FIG. 8 illustrates a typical schedule control drawing in accordance with the present invention that is color coded with flagged task identifiers that graphically display the schedule status for various intelligent objects.

FIG. 8 illustrates a typical schedule control drawing 301 having several construction items 300, 310 in accordance with the present invention. The drawing is shown as being color (or shaded) coded with flagged task identifiers to display the scheduling status for various intelligent objects. This is possible because each item is an intelligent object. In the illustrated embodiment, the legend for the task identifiers 320 is in the lower left hand corner. Legend 320 quickly gives a user the necessary information to associate a color (or shade) with a schedule status for an intelligent objects 310 and 320. Legend 320 includes a "start by date" category and a "complete by date" category. In one embodiment, a schedule status option is an intelligent button 303 that displays a scheduling status menu in response to a user selection. The scheduling status menu is not illustrated but operates in much the same manner as the material status update menu described previously.

FIG. 9 illustrates an example of one technique for producing reports and for associating scheduled completion dates and actual completion dates with the items of FIG. 8. FIG. 9 includes a graphical user interface 330 having various places to enter data and specify parameters. For example, for each item in row 380, the start date and scheduled completion dates may be entered as shown in columns 340 and 350. The actual completion date is entered in column 360. This information is then stored on a computer readable medium for future use. Scheduled completion date 350 may be automatically updated according to information received from the labor and materials modules. For example, an entry into the labor module that indicates work has begun in a particular location automatically updates the start date. Also, an entry into the materials module that indicates an item on back order automatically updates the scheduled completion date if the anticipated receipt date is beyond the original scheduled completion date.

In addition, a user is given various choices to further narrow how a report is displayed. For example, a scope region 390 may be chosen by a user, and may designate a drawing number, a room, a particular grouping of construction items or the like. An item filter 370 may be used to show all items or any chosen subset of said items. A report filter 395 indicates the type of dates the user wants to generate. In the illustrated example, a user has chosen to illustrate all schedule dates, however, any number of status filters may be used.

TABLE 9

Schedule

Reporting Date: Jun. 24, 2000
Scope: Drawing M-2: CHW: Mech Rm   Report Filter:   Item Filter:
                                    Schedule Dates   All Tasks

| Schedule | Start Date | Scheduled Completion Date | Completed Date |
|---|---|---|---|
| Marital Distribution | Jun. 12, 2000 | Jun. 14, 2000 | Jun. 15, 2000 |
| Hangers Layout/Inserts | Jun. 29, 2000 | Jul. 2, 2000 | Jul. 5, 2000 |
| Item in Place | Jul. 18, 2000 | Jul. 28, 2000 | Jul. 26, 2000 |
| Joint Make Up | Jul. 19, 2000 | Jul. 29, 2000 | Aug. 3, 2000 |
| Test | Nov. 26, 2000 | Dec. 14, 2000 | |
| Punch & I.D. | May 11, 2001 | Jun. 1, 2001 | |

Table 9 shows an example of a report generated for schedule information. This simple report illustrates the start date, the scheduled completion date and the completion date for the various phases of material installation.

TABLE 10

Schedule Completion

Reporting Date: Jun. 24, 2000
Scope: System; Areas        Report Filter: Completion   Item Filter:
                            Date                        All Tasks
                            Filter Date: Jun. 27, 2000

TABLE 10-continued

| | | Schedule Completion | | | |
|---|---|---|---|---|---|
| System | Areas | Task | Hours Complete | Start Date | Scheduled Completion Date |
| CHW | Mech Rm | Hangers | 86 | Jun. 2, 2000 | Jun. 14, 2000 |
| HHW | Mech Rm | Item In Place | 253 | May 21, 2000 | Jun. 17, 2000 |
| CDW | Mech Rm | Joint Make Up | 189 | May 12, 2000 | Jun. 14, 2000 |
| CHW | East Wing | Hangers | 64 | Jun. 15, 2000 | Jun. 23, 2000 |
| HHW | East Wing | Joint Make Up | 147 | May 23, 2000 | Jun. 12, 2000 |

Table 10 illustrates how a contractor can further define the filter information to obtain a greater amount of detailed information. This particular example shows the tasks for a defined area. The report gives the hours completed for the task, as well as the start date and the scheduled completion date. Scheduling reports provide a quick and easy determination of the progress of a construction project.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for tracking and evaluating labor for a construction project, the method employing a computer having a display screen, an entry device and a processor, the processor being coupled to said display screen and performing the method comprising:

providing a drawing, said drawing comprising construction items;

associating a completed labor task with one or more construction items;

flagging the construction items associated with said completed labor task on said drawing with one of a plurality of task identifiers, wherein said task identifier relates to said completed labor task associated with said construction items;

displaying said drawing and said task identifiers on said display screen;

selecting an option from said drawing;

selecting a completed labor task from a labor status menu generated in response to selecting said option from said drawing;

defining an area comprising one or more construction items associated with said selected completed labor task using a drop-down menu;

associating said selected completed labor task with said construction items in said area; and indicating on said drawing for each of the one or more construction items in said area, the task identifier of the associated selected completed labor task.

2. The method of claim 1, further comprising:

associating estimated labor information with said construction items;

capturing actual labor information and associating said actual labor information with said construction items; and crediting said estimated labor for said completed labor task associated with said area.

3. The method of claim 2, further comprising generating a report comparing the actual labor information with the estimated labor information.

4. The method of claim 1, wherein said drawing is a CAD drawing, and further comprising indicating a color for said task identifiers, wherein said color represents said labor status.

5. The method of claim 2, further comprising capturing said estimated labor by an estimating system.

6. The method of claim 2, further comprising manually entering actual labor using said entry device.

7. The method of claim 1, wherein said flagging further comprises coloring said construction item on said drawing with a color associated with said task identifier.

8. The method of claim 1, wherein said task identifiers indicate a labor task selected from a group consisting of material distributed, hangers in place, joint make-up, items in place, punch and identify and tested.

* * * * *